M. EDWARDS.
STREET SWEEPER.
APPLICATION FILED JULY 8, 1910.
998,080.
Patented July 18, 1911.
2 SHEETS—SHEET 2.
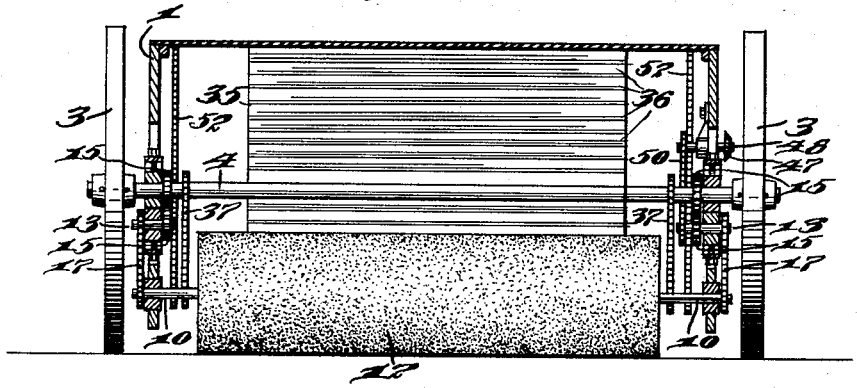
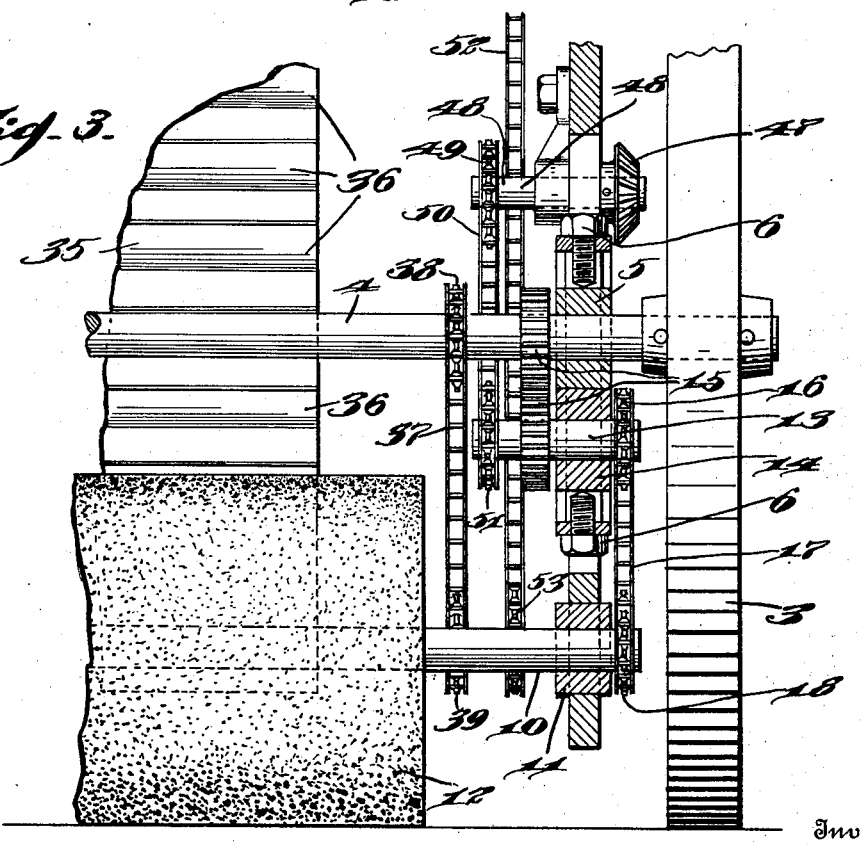

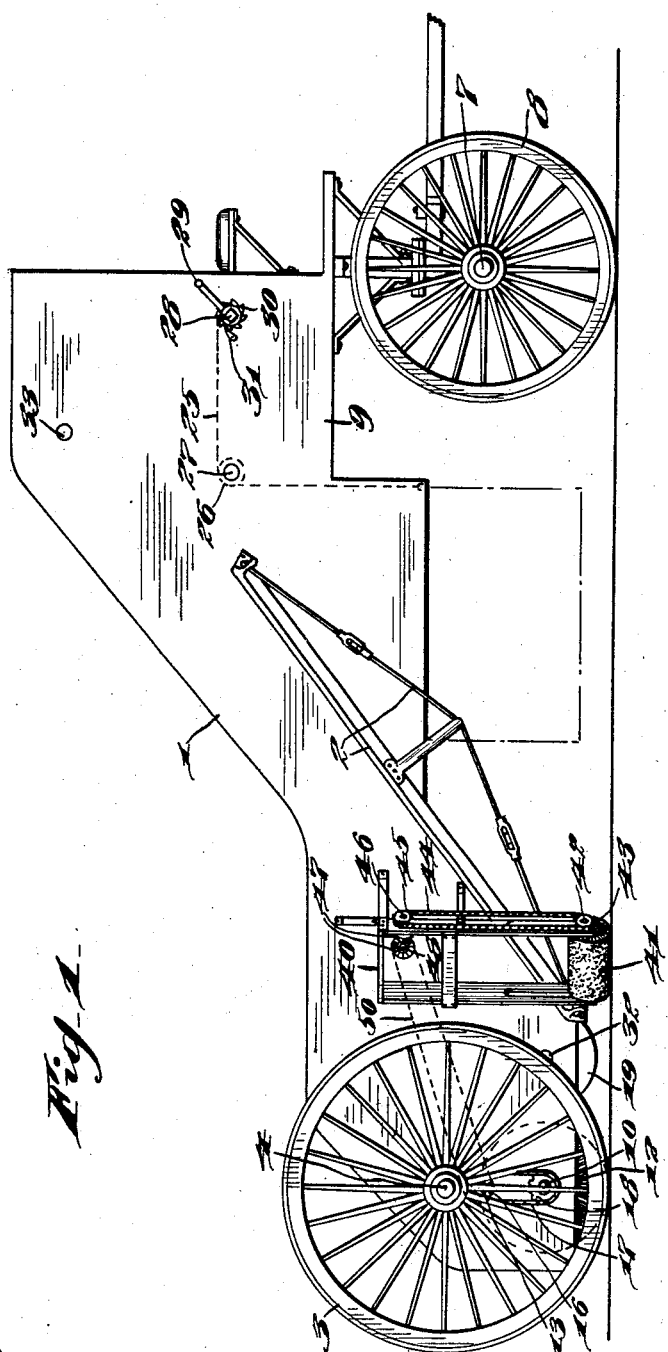

UNITED STATES PATENT OFFICE.

MARMADUKE EDWARDS, OF PHILADELPHIA, PENNSYLVANIA.

STREET-SWEEPER.

998,080. Specification of Letters Patent. Patented July 18, 1911.

Application filed July 8, 1910. Serial No. 570,945.

*To all whom it may concern:*

Be it known that I, MARMADUKE EDWARDS, a citizen of the United States, residing at Philadelphia, in the county of Philadelphia and State of Pennsylvania, have invented certain new and useful Improvements in Street-Sweepers, of which the following is a specification.

My invention relates to improvements in street sweepers, the object of the invention being to provide an improved apparatus which when moved over the street, will take up the dirt and trash thereon and carry it away, and which may be operated to dump the dirt and trash accumulated therein.

A further object is to provide an improved apparatus of this character with a main brush for taking up the dirt, said brush extending transversely across the rear of the apparatus, in combination with a smaller brush located at an angle to the line of draft and adapted to throw the dirt and trash into the path of the first-mentioned brush, and provide improved means for operating the brushes, and improved means for collecting the dirt and trash moved by the brushes in a drop bottom compartment from which it may be dumped as desired.

With these and other objects in view, the invention consists in certain novel features of construction and combinations and arrangements of parts, as will be more fully hereinafter described and pointed out in the claims.

In the accompanying drawings: Figure 1, is a view in side elevation illustrating my improvements. Fig. 2, is a view in cross section through the rear end of the apparatus, and Fig. 3, is an enlarged fragmentary view of the right hand end of the apparatus, illustrated in Fig. 2.

1, represents the body of the vehicle which may, of course, be made in various ways, but is preferably a boxed in or inclosed structure strengthened by trusses 2 at each side, and supported at the rear end by wheels 3, in which the rear axle 4 is secured and mounted in suitable bearings 5 in the body. These bearings 5 are preferably adjustable by means of set screws 6, and the axle 4 serves to drive all of the parts of the cleaning apparatus, as will hereinafter appear.

The forward end of the body 1 is supported on a pivoted axle 7, mounted in wheels 8, and the body is preferably cut under as illustrated at 9 to allow the front axle to pivot in guiding the vehicle around corners. Below the axle 4 and parallel therewith, a shaft 10 is mounted in bearings 11 in the body 1, and on this shaft 10, a rotary brush 12 is secured. Short countershafts 13 are supported in bearings 14 below axle 4, and between the same and the shaft 10, and the bearings 14 of these short shafts 13 are adjustable in the body by means of the screws 6 above referred to, as the bearings 5, and 14, must always move together because gears 15 are secured on axle 4, and shafts 13, and intermesh, whereby power is transmitted from the axle to the shaft.

Sprocket wheels 16 on shafts 13 are connected by sprocket chains 17 with sprocket wheels 18 on shaft 10, and transmit rotary motion to the brush 12. The brush 12 sweeps the dirt and trash forwardly into a chamber 19 from which the dirt is carried up into the body 1 by means of the conveyer 35, which constitutes an apron having an endless series of buckets 36 thereon. To operate this endless chain of buckets, an endless sprocket chain 37 is provided and connects a sprocket wheel 38 on axle 4, with a sprocket wheel 39 on shaft 32. To insure a positive movement of the endless chain of buckets, sprocket chains 52 are fixed to move with the apron 35, and turn on sprocket wheels 53 fixed to shafts 32, and 33, respectively, so that as these shafts are turned, the endless conveyer is compelled to move.

On one side of the body 1, preferably the right hand side, a frame 40 is located and positioned at an angle to the line of draft. In the lower end of this frame 40, a rotary brush 41 is mounted and is designed to throw the dirt into the path of the main brush 12. This brush 41 is preferably mounted so as to permit of a certain amount of vertical adjustment, and its shaft 42 has a sprocket wheel 43 thereon, which is connected by a chain 44 with a sprocket wheel 45 on a short shaft 46, mounted in the upper portion of the frame 40. This short shaft 46 is connected by beveled gears 47 with a short shaft 48, mounted in body 1, and a sprocket wheel 49 on the inner end of this shaft 48 is connected by a chain 50, with a sprocket wheel 51 on the short shaft 13 at the right hand side of the body, so that power is transmitted from this short shaft 13 to both brushes 12, and 41.

The operation is as follows: As the apparatus is drawn over the ground, the main brush 12 and the smaller diagonally disposed brush 41 are revolved through the medium of the mechanism above described. The small brush 41 throws the dirt and trash under the apparatus into the path of movement of the main brush 12, and the latter sweeps it up into the receptacle 19, from which it is carried into the body by means of the endless buckets 36.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In an apparatus of the character described, the combination with a body, front and rear axles supporting the body, wheels supporting the axles, and a rotary brush carried by said body and adapted to brush the dirt forwardly, of a diagonally positioned frame at one side of said body, a diagonally positioned brush in said frame, means for permitting vertical movement of the brush in said frame, a short shaft supported in the upper part of the frame, sprocket wheels on said short shaft and on said brush, a chain connecting said sprocket wheels, and motion transmitting means between said rear axle and said short shaft, substantially as described.

2. In an apparatus of the character described, the combination with a body, wheels supporting the body, and a rotary brush carried by said body and adapted to brush the dirt forwardly, of a diagonally positioned frame at one side of said body, a diagonally positioned brush in said frame, means for permitting vertical movement of the brush in said frame, a short shaft supported in the upper part of the frame, sprocket wheels on said short shaft and on said brush, a chain connecting said sprocket wheels, a shaft driven by the rear axle, sprocket wheels on said last-mentioned shaft, and chains operated by said wheels and constructed to operate the first-mentioned forwardly driving brush and the diagonally positioned brush, substantially as described.

In testimony whereof I have signed my name to this specification in the presence of two subscribing witnesses.

MARMADUKE EDWARDS.

Witnesses:
　Ed. Sands,
　George Raymond Squires.

---

Copies of this patent may be obtained for five cents each, by addressing the "Commissioner of Patents, Washington, D. C."